Dec. 11, 1951  A. F. HICKMAN  2,577,761
SPRING SUSPENSION FOR VEHICLES
Filed Nov. 4, 1948  3 Sheets-Sheet 3
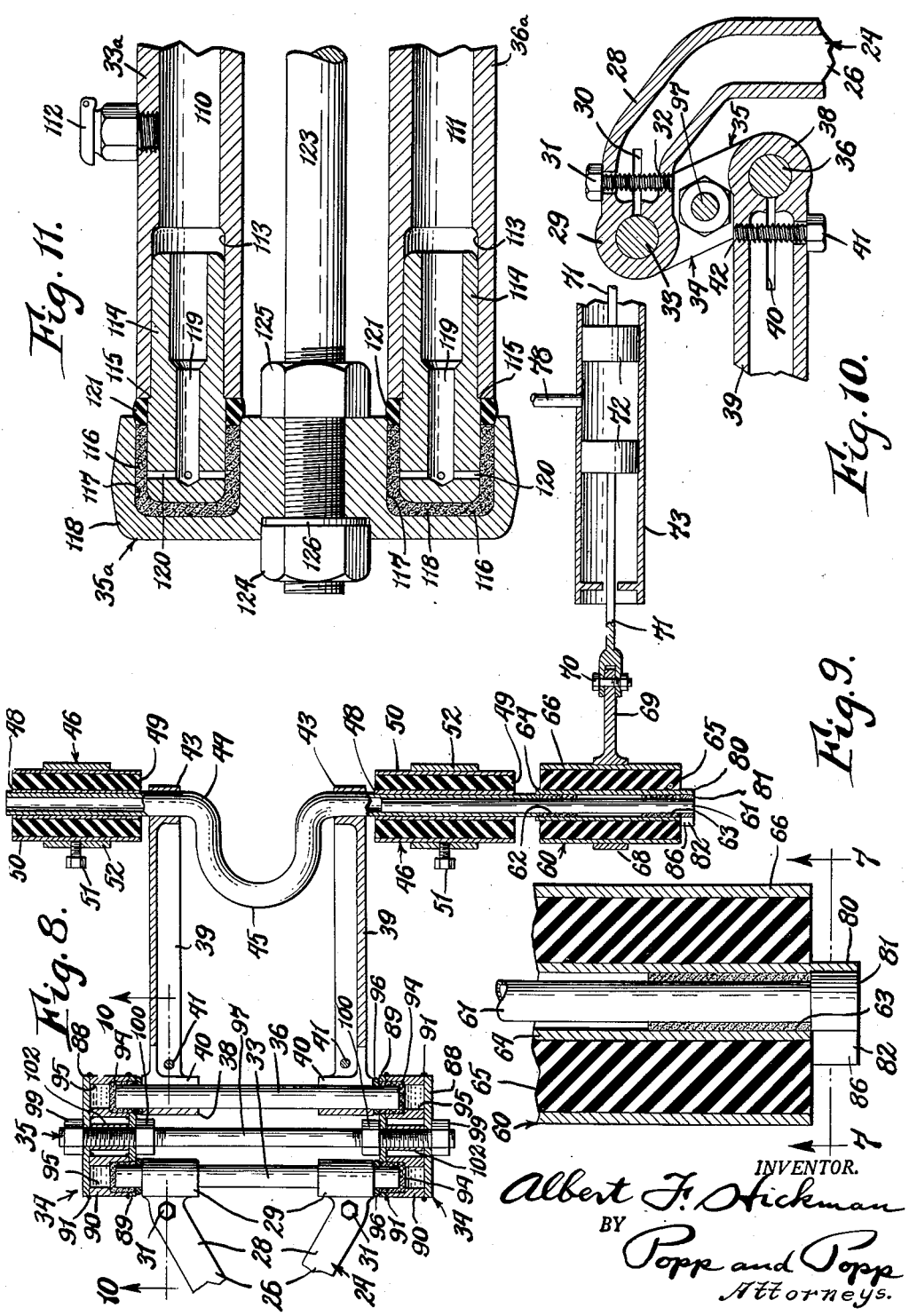
INVENTOR.
Albert F. Hickman
BY
Popp and Popp
Attorneys.

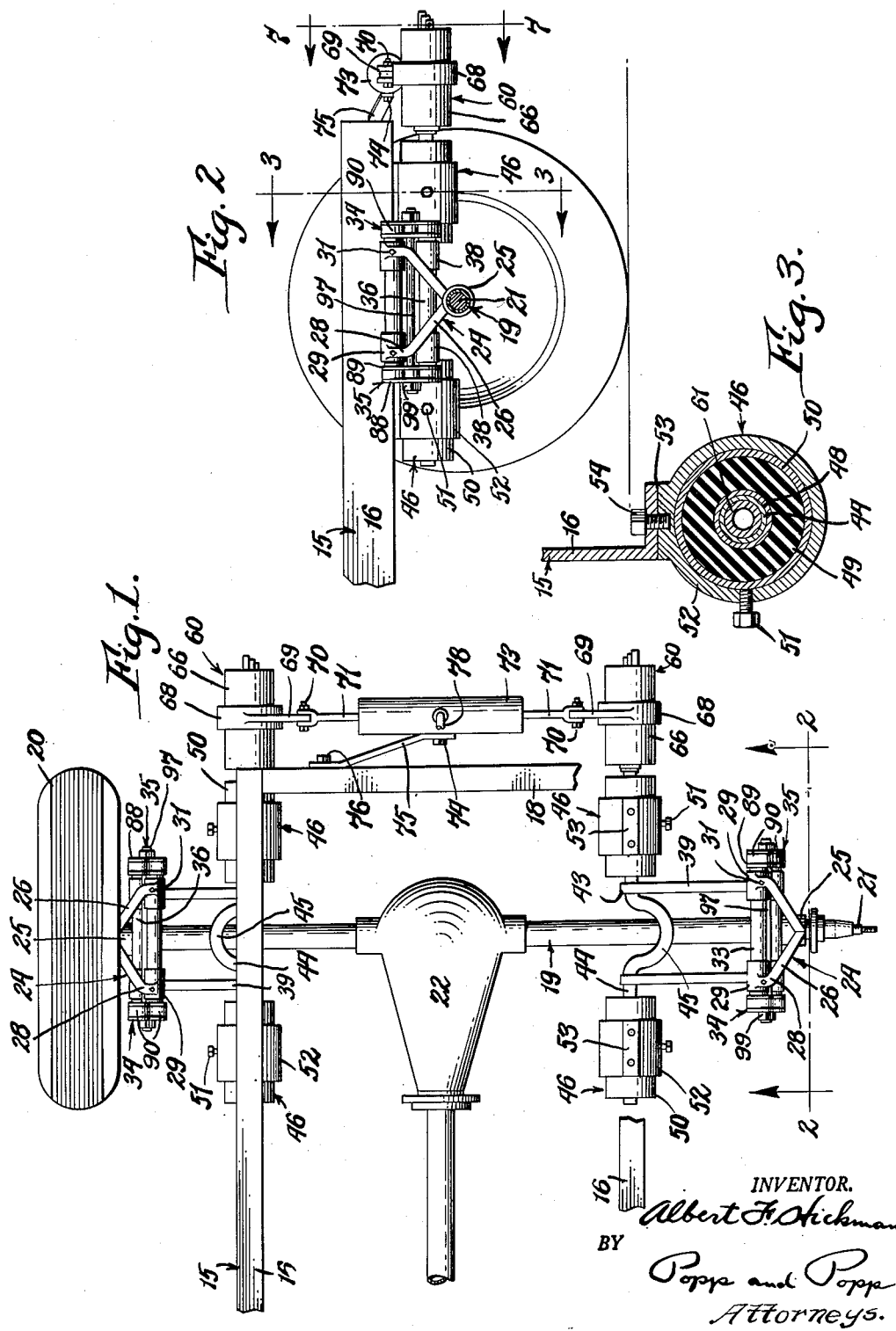

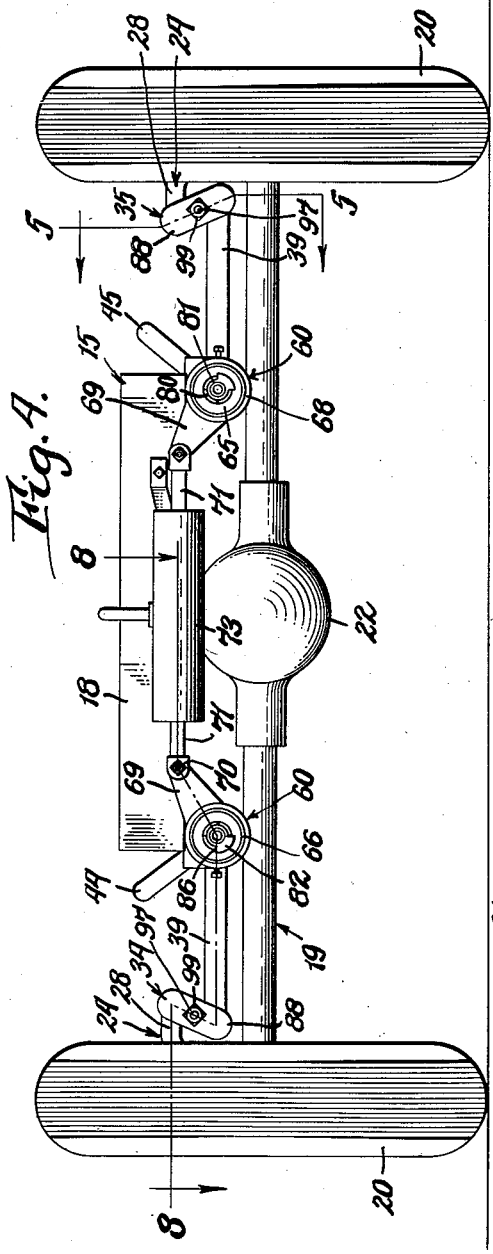

Patented Dec. 11, 1951

2,577,761

UNITED STATES PATENT OFFICE 2,577,761

SPRING SUSPENSION FOR VEHICLES

Albert F. Hickman, Eden, N. Y., assignor to Hickman Industries, Inc., Eden, N. Y., a corporation of New York Application November 4, 1948, Serial No. 58,300

6 Claims. (Cl. 267—21)

This invention relates to a spring suspension for vehicles and is shown as embodied in a torsional type of spring suspension between the rear or drive axle and the frame of a vehicle and in which this axle is permitted to move against a geometrical resilient resistance, both laterally and vertically, relative to the vehicle frame.

The present invention relates generally to the type of spring suspension shown in my Patent No. 2,245,585, granted June 17, 1941.

In common with my said patent, important objects of the present invention are to provide a spring suspension, (1) which will function to safely support the car body at high speeds, both when loaded and unloaded; (2) which reduces and cushions both the vertical and lateral impacts from the axles against the body of the vehicle, both when the vehicle is loaded and unloaded, and without imposing undue end thrusts on the pivotal connections which connect the axles to the body; (3) in which torsion springs are employed to provide a longer and variable spring resistance range; (4) in which geometric resilient resistance is obtained in a compact structure which requires no lubrication and is free from the squeaks incident to the use of leaf springs; (5) in which the distribution of the load to the body is at a plurality of spaced points; (6) in which side sway is reduced to any desired amount; (7) in which periodic vibration of the suspension is dampened out and in which wheel tramp is avoided; (8) in which all forces are cushioned so as to increase gasoline mileage and decrease tire wear; (9) which has light unsprung weight; (10) in which the metal stresses are within safe working limits of heat treated forgings or castings; (11) which can be produced at low cost and in particular requires only simple machining operations; (12) in which the parts are arranged inside of the wheels and in which the parts are located close to the wheels to provide wide pivot positions and increased stability; (13) which can easily be taken down and repaired; (14) in which any desired frequency or degree of spring deflection can be obtained; (15) in which auxiliary devices for the control of side sway are rendered unnecessary; and (16) which is extremely compact and will stand up under conditions of severe and constant use with very little servicing.

In such spring suspensions it is desirable to provide increased resilient resistance when the vehicle is heavily loaded and to cut such increased resilient resistance out of service when the vehicle is lightly loaded or empty. At the same time it is desirable to maintain the same frequency of the spring suspension regardless of whether the additional resilient resistance is cut into service or not.

It is accordingly one of the principal specific objects of the present invention to provide a spring suspension in which additional resilient resistance can be cut into and out of service without substantial alteration of the frequency of the suspension.

Another object is to provide such a spring suspension in which the additional resilient resistance is cut into service at opposite ends of the vehicle axle and in which such additional resilient resistance at opposite ends of the axle are equalized, Another object is to provide such a suspension in which the additional resilient resistance is in the form of a torsion spring, particularly a rubber torsion spring.

Another object is to provide such a suspension in which the cutting in and out of service of the additional resilient resistance can be remotely controlled, particularly from the driver's seat.

Another object is to provide a suspension which embodies shackle structures which are free from servicing difficulties, particularly in point of lubrication.

Another object is to provide such a spring suspension, all parts of which are of sturdy construction and not liable to get out of order under conditions of severe and constant use.

Other objects and advantages will appear from the following description and drawings, in which:

Fig. 1 is a fragmentary top plan view of the rear end of a vehicle frame supported on a rear axle by a torsion spring suspension embodying my invention.

Fig. 2 is a fragmentary vertical sectional view taken on line 2—2, Fig. 1.

Fig. 3 is an enlarged vertical section taken on line 3—3, Fig. 2.

Fig. 4 is a rear elevational view thereof.

Fig. 5 is an enlarged section taken on line 5—5, Fig. 4.

Fig. 6 is a vertical section taken on line 6—6, Fig. 5.

Fig. 7 is an enlarged vertical section taken on lines 7—7, Figs. 2 or 9.

Fig. 8 is an enlarged fragmentary laid out section of the axle bracket, shackle structure, crank arm, and rubber torsion springs connecting one end of the rear axle with the frame of the vehicle, this section being taken generally on line 8—8, Fig. 4, and showing parts in elevation.

Fig. 9 is an enlarged view of the lower end of Fig. 8.

Fig. 10 is an enlarged vertical section taken generally on line 10—10, Fig. 8.

Fig. 11 is a view similar to Fig. 5 and showing a modified form of shackle construction.

The main frame 15 of the vehicle can be of any suitable construction and is conventionally shown as comprising a pair of longitudinal horizontal side frame bars in the form of inwardly facing channels 16 and connected at their ends by cross channel bars 18, the rear cross bar being shown. The rear end of the vehicle frame is shown as supported through the spring suspension embodying the present invention, by a drive axle housing 19 in turn supported by rear driving wheels 20 at its opposite ends, these wheels being fast to the usual pair of rear drive axles 21 connected by the usual differential contained in a differential housing 22 forming part of the drive axle housing.

To each end of the drive axle housing 19 is secured an axle bracket indicated generally at 24. As best shown in Fig. 2, each of these axle brackets comprises a sleeve 25 fitting around and welded or otherwise secured to the corresponding end of the drive axle housing and having welded thereto a pair of upwardly extending tubular arms 26 which diverge from each other in a fore-and-aft direction and the upper extremity of each of which curves toward the frame of the vehicle to provide a gooseneck 28. As best shown in Figs. 8 and 10, the end of each gooseneck 28 is formed to provide a horizontal sleeve 29, these sleeves of each axle bracket being in line with each other along a common axis extending fore-and-aft of the vehicle. Along a horizontal plane intersecting this axis each of these sleeves 29 and the end of the corresponding gooseneck is split, as indicated at 30, Fig. 10, this split extending part way into the end of the gooseneck 28 and through the adjacent side of the sleeve 29 and the parts of the gooseneck and sleeve divided by this split being capable of being drawn together by a screw 31 extending vertically through the tubular gooseneck 28 centrally of the split and screwing into a threaded hole 32 in the side of the gooseneck opposite the head of the screw. An axle pivot pin 33 extends through the sleeves 29 of each pair of arms 26 and is clamped therein by tightening the corresponding pair of screws 31.

The projecting ends of these axle pivot pins 33 are secured by the shackles 34 of a shackle structure indicated at 35 with the projecting ends of similar crank arm pivot pins 36 clamped within a pair of sleeves 38, each arranged at the outer end of a crank arm 39 and formed integrally therewith. These crank arms are of channel or U-shape in cross section horizontally disposed and the outer end of each is split, as indicated at 40, Fig. 10, in a generally horizontal plane intersecting the axis of the crank arm pin 36, this split extending through the adjacent side of the sleeve 38. To draw each sleeve 38 into clamping engagement with the crank arm pin 36, a clamping screw 41 extends vertically through the split portion of each crank arm 39, this screw extending through a threaded opening 42 in the side of the crank arm opposite the head of the screw.

The opposite end of each crank arm 39 is formed to provide a sleeve 43 embracing and welded to a tubular crank shaft 44. This crank shaft extends fore-and-aft of the vehicle under the corresponding longitudinal frame bar 16 and is journalled thereto. Between the crank arms 39 each rock shaft 44 is provided with a curving offset 45 to provide clearance for the vertically movable drive axle housing 19. Each end of each crank shaft 44 is journalled in a rubber torsion spring, indicated generally at 46, and which is preferably constructed as follows:

The numeral 48 represents a metal sleeve welded or otherwise fastened to the corresponding end of the tubular crank shaft 44. To the periphery of this sleeve 48 is vulcanized a relatively thick rubber sleeve 49, this rubber sleeve being in turn vulcanized in the bore of an enclosing metal sleeve 50. This sleeve in turn is held, by a set screw 51, within the bore of a tubular frame bracket 52. As best shown in Fig. 3, the upper side of each of these tubular frame brackets 52 can be flatened, as at 53, to fit the under side of the corresponding longitudinal side frame bar 16, and can be secured thereto by a pair of screws 54.

For normal load conditions, the rubber torsion springs 46 at the opposite ends of the crank shafts 44 provide the necessary resilient support for the vehicle. When a large variation in load exists it is desirable to provide additional resilient resistance to the movement of the vehicle frame relative to the axles without substantial alteration of the frequency of the suspension. To this end means are provided for adding a rubber torsion spring, indicated generally at 60, between each crank shaft 44 and the vehicle frame, which means are preferably constructed as follows:

The numeral 61 represents an axial extension, of reduced diameter, of the crank shaft 44 and in the form of a tube which is inserted in the rear end of each tubular crank shaft 44 and which projects outwardly therefrom, this tube being secured in any suitable manner so as to be fast to the crank shaft. This extension or tube 61 carries a pair of spaced bearing bushings 62 and 63 which are preferably made of a lubricant impregnated material. These bearing bushings are disposed in a metal sleeve 64 to the exterior of which a relatively thick rubber sleeve 65 is vulcanized. This rubber sleeve is also vulcanized in the bore of a metal sleeve 66 which in turn is embraced and fast to a tubular bracket 68 formed to provide a lever arm 69. As best shown in Figs. 4 and 8, these lever arms extend upwardly and inwardly toward the center of the vehicle frame and are connected by pivot pins 70 to the outer ends of the rods 71 of opposed pistons 72 in a horizontal cylinder 73. This cylinder 73 is arranged in the rear of the rear cross bar 18 of the vehicle frame and is pivotally connected at its center, as indicated at 74, to a horizontal tie bar 75, the other end of this tie bar being pivotally secured, as indicated at 76, to one end of the rear frame cross bar 18. To render the auxiliary springs 60 effective, the opposed pistons 72 are expanded or moved away from each other and for this purpose a liquid line 78 connects with the center of the cylinder 73. When a heavy load is imposed on the vehicle the driver can apply liquid under pressure through any suitable control (not shown) to the liquid line 72 to so expand the pistons 72.

To render this expanding movement of the pistons 72 effective to cut the auxiliary torsion springs 60 into service, a lost motion connection is provided between the rear end of each extension or tube 61 and the corresponding sleeve 64 and which is preferably constructed as follows:

The numeral 80 represents an axial extension, in the form of a segment or quadrant thereof, of the inner metal sleeve 64 of the auxiliary rubber spring 60 at the outer end thereof. The numeral 81 represents a collar fitting around the crank arm extension or tube 61 and fitting within this segmental extension or quadrant 80 of the sleeve 64, this collar 81 having, at the side normally opposite this segmental extension 80, a radial enlargement 82 also in the form of a segment or quadrant. The collar 81, together with its radially extending segment or quadrant 82, is shown as fastened to the sleeve 81 by a tapered pin 83. This sleeve 81 and its radially extending segment or quadrant 82 are fast to the crank shaft 44 through the tapered pin 83 and the tube 61 secured within the end of this crank shaft. On the other hand, the axial extension or quadrant 80 is a part of the inner metal sleeve of the rubber spring 60. Accordingly, each crank shaft 44 can move 45° in either direction independently of its auxiliary spring 60, this degree of movement being determined by the spaces 84 between the corresponding segments 80 and 82 and this spacing being sufficient to render the auxiliary spring 60 ineffective under all load conditions. When the load on the vehicle demands the use of the auxiliary springs 60, the driver applies fluid under pressure to the line 78 to expand the two pistons 72 in the cylinder 73. This moves the two arms 69 at the rear of the vehicle outwardly or away from each other and since these arms are fast to the outer metal sleeves 66 of the rubber springs 60, this movement rotates the two rubber springs so as to bring the upper faces 85 of the axial segmental extensions 80 thereof into engagement with the upper faces 86 of the radial segmental extensions 82 of the crank shaft assembly. Accordingly the increased load is now supported not only by the rubber springs 46 but additionally by the auxiliary rubber springs 60. It is an important feature of the invention that such cutting into or out of service of the auxiliary rubber springs 60 does not change the frequency of the suspension as a whole so that the ride characteristics of the spring suspension as a whole remain the same while at the same time the proper degree of resilient resistance can be provided both for heavy and light loads. It will also be noted that by the use of the opposed pistons 72, the resistance imposed by the auxiliary springs 60 at opposite sides of the vehicle is equalized. It will also be noted that the pivotal connection of the cylinder 73 to the vehicle frame 15 through the link 75 holds the cylinder in operative position at all times and at the same time permits it to move to adapt itself to all conditions.

The shackle structures 35 employed to connect the projecting ends of the axle pivot pins 33 with the ends of the crank arm pivot pins 36 are designed to provide shackles which act to resist end thrust developed by acceleration and deceleration of the vehicle in driving and braking; to permit the necessary swinging of the shackles 34; to maintain the bearings thereof fully lubricated for a long period of time; and to permit of the ready assembly of the shackle structure with all parts in correct alinement and having correct tolerances. For this purpose each of these shackle structures is preferably constructed as follows:

Each shackle 34 comprises a pair of flat links 88, 89 between the opposite ends of which a pair of parallel bearing sleeves 90 is interposed, these bearing sleeves being welded, as indicated at 91, to the opposing flat faces of the links 88, 89, this weld between these bearing sleeves and the link 88, in particular, providing a leak tight joint. The end of each bearing sleeve 90 adjacent the link 89 is provided with an enlarged bore 92 registering with an opening 93 equal in size to the link 89. In each of these openings 93 and the corresponding enlarged bore 92 is fitted a cup-shaped bearing 94, the end wall of each of these cup-shaped bearings being spaced from the link 88 to provide a reservoir 95 for a quantity of lubricating oil. Each cup-shaped bearing 92 receives the corresponding end of one of the pivot pins 33, 36. Each cup-shaped bearing 94 is preferably made of sintered metal and porous so as to permit the feed of lubricating oil from each reservoir 95, through the corresponding cup-shaped bearing 94 to the surface of the corresponding end of the pivot pin 33 or 36. A graphite impregnated ring shaped oil seal 96 of synthetic rubber or the like is preferably compressed against the end of each cup-shaped bearing 94 and the surrounding exterior face of the link 89 by the adjacent end of the sleeve 29 or 38 of the axle bracket 24 or crank arm 39.

These cup-shaped bearings 94 journal the opposite ends of each pair of axle pivot pins 33 and the crank arm pivot pins 36, a pair of identical shackles 34 being applied to the opposite ends of each pair of these pins. This pair of shackles is joined together by a tie rod 97 having opposite threaded ends extending through the links 88, 89 of the two shackles. The opposite threaded ends of this tie rod are provided with outer nuts 99 which engage the exterior faces of the links 88 and with inner nuts 100 which engage the exterior faces of the links 89. A spacing sleeve 102 is arranged around the corresponding threaded end of each tie rod 97 and is interposed between the links 88, 89.

It will be seen that the reservoir 95 for each bearing 94 provides an adequate supply of lubricating oil for a long period of operation, especially in combination with the oil seals 96. Also the shackle assemblies 35 are readily assembled by first applying the nuts 100 to the tie rods 97, fitting a pair of the assembled shackles 34 together with the spacers 102 over the opposite ends of this tie rod and at the same time fitting the ends of the pins 33, 36 in the cup-shaped bearings 94, applying and tightening the nuts 99 to provide the required thrust fit between the pins 33, 36 and the cup-shaped bearings 94, and finally tightening the nuts 100 to clamp the parts of each shackle 34 in this fitted relation.

The modified form of shackle structure 35a shown in Fig. 11, is designed to provide an even larger reservoir of oil for the bearings and to this end the axle pivot pin 33a and crank arm pivot pin 36a are made of tubular form to provide large reservoirs 110 and 111, respectively, and each of which can be replenished through a filling opening normally closed by a screw plug 112. At each end of each of these pins 110, 111, the bore is enlarged, as indicated at 113, to receive the inner end of a journal pin 114 press fitted therein, each of these pins having a shoulder 115 to limit its inward movement. Each pin 114 projects outwardly from the corresponding end of its axle pivot pin 33a or crank arm pivot pin 36a into a cup-shaped bearing 116 fitted in a blind bore 117, at the corresponding end of a shackle body 118. The cup-shaped bearings 116 are made of sintered metal and are supplied with oil from the corresponding reservoir 110, 111 through an axial bore 119 and radial ducts 120, these being provided in the corresponding journal pin 114 and the ducts 120 supplying oil directly to the cup-shaped bearing 116. Each bearing 116 is sealed against the loss of oil by a graphite-impregnated flexible band 121 encircling each journal pin 114 and interposed between the end of the corresponding bearing 116 and the corresponding end of the adjacent pin 33a or 36a.

The shackle bodies 118 are held in proper position by a tie rod 123 having threaded ends, each end carrying a pair of nuts 124 and 125, the former being provided with a spring washer 126.

The assembly of the shackle structure 35a is similar to the assembly of the preferred form of the shackle structure 35 shown in Figs. 1–10. Thus, the nuts 125 are applied to the opposite threaded ends of a tie bolt 123 and are backed up beyond their operative position. The two shackle bodies 118, together with their cup-shaped bearings 116, are then fitted over the opposite threaded ends of the tie rods 123 and over the ends of the journal pins 114 and against the oil seals 121. The nuts 124, together with their lock washers 126, are then applied to opposite ends of the tie rod 123 and tightened to secure the desired fit between the shackle bodies 118 and the pins 33a, 36a. Following this the nuts 125 are tightened against the shackle bodies 118 so as to hold all parts of the shackle structure in properly fitted relation.

In the operation of the suspension, the upward movement of one end of the rear axle housing 19, through the shackles 34, swings the outer end of the corresponding pair of crank arms 39 upwardly, the fulcrum of these crank arms being the crank shaft 44 to which these crank arms are fixed. This crank shaft 44 is connected to the frame 15 of the vehicle by the pair of rubber torsion springs 46. This rotation of the crank shaft 44 is yieldingly resisted by the rubber bodies 49 of these torsion springs, each of these rubber bodies being vulcanized to the corresponding inner metal sleeve 48 fast to the crank shaft 44 and to the corresponding outer metal sleeve 50 fast to the corresponding bracket 52 which secures the rubber spring to the vehicle chassis 15. It will therefore be seen that these rubber torsion springs 46 normally provide the yielding support for the rear end of the chassis frame 15.

It will be noted that the shackles 34 are inclined upwardly and inwardly from the crank arm pivot pins 36 to the axle pivot pins 33. This upward and inward inclined arrangement of these shackles tends to cause the axle to centralize itself in a direction transverse of the chassis and enables the action of gravity to geometrically and resiliently resist any such movement of the axle away from its central position. This permits the vehicle body to move substantially straight ahead despite a certain amount of lateral movement of the axle. This arrangement of the shackles 34 further provides high and wide pivot positions which provide increased stability in that it provides effective spring centers which can be as wide or wider than the track of the vehicle. Further, this arrangement of the shackles reduces side sway, the high and wide pivot positioning, together with the upward and inward slant of the shackles, providing a suspension in which the vehicle body is more nearly suspended than mounted. Other important advantages which flow from the inclined arrangement of the shackles are the reduction in the possibility of wheel tramp, and in the elimination of the need for anti-body roll devices, such as torsion bar stabilizers.

When one end of the axle housing 19 is so forced upwardly relative to the chassis, the effective resilient opposing force of the rubber torsion springs 46 increases at a geometric rate and not at an arithmetic rate. In this particular case, the geometric rate is of the accelerated increase type in which increments of vertical movement of the axle are opposed by an accelerated rate of resilient resistance. This is primarily due to the progressive decrease in the effective leverage of the crank arms 39 as they swing upwardly and inwardly about their axes of rotation. This action is also influenced by the varying angularity of the shackles 34, and the fact that increments of vertical displacement of the pivot pins 36 cause accelerated rates of increase in the angular displacement of the rubber torsion spring 46. This latter is due to the fact that increments of vertical movement of said pivot pins 36 are not proportional to the accompanying increments of angular twist to which their companion rubber torsion springs 46 are subjected.

This geometric action also occurs when the axle housing 19 moves downwardly relative to the chassis 15. Throughout this particular movement the geometric action is of the accelerated decrease type, that is, as the axle housing passes through increments of downward movement, the rate of decrease of the resilient force tending to push the axle downwardly decreases.

By this means, so far as vertical forces are concerned, the vehicle chassis 15 is free to "float" along solely under the influence of gravity (plus whatever vertical momentum forces are present), this feature being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and the body. Such a desirable result is quite different from that obtained from the conventional leaf spring suspension in which the axle and the rest of the unsprung weight drags or jerks down the body whenever the strains imposed on the chassis are negative. With the present suspension, no such negative force, tending to pull the body downwardly, is possible.

Another important advantage obtained by the angular arrangement of the shackles 34 is that it eliminates wheel tramp. This latter may be broadly defined as a periodic vibration of either axle in a vertical transverse plane, the definition being usually limited to a rotary movement about an axis of rotation located at some point in the axle. In general it may be said that if one wheel is lifted and if this movement causes a downward thrust on the opposite wheel, then wheel tramp results. Such wheel tramp is prevented in the present suspension by insuring that the downward thrust of any axle pivot 33 lies in a plane directed toward the contact of the tire with the road. When such condition obtains, a vertical upward thrust against one wheel is opposed by a directly opposite force passing through the corresponding axle pivot 33 and hence no downward thrust is imposed upon the opposite wheel as occurs in the conventional leaf spring suspension.

With vehicles subject to a wide variation in load, it is desirable to provide additional resilient resistance within the spring suspension while at the same time not altering the frequency of the spring suspension so that the same desirable ride conditions are maintained. When the vehicle is to be loaded to a point where such additional resilient resistance is called for or, in the case of a bus, for example, where the load builds up to a point requiring such additional resilient resistance, the driver applies fluid pressure through the line 78 into the center of the hydraulic cylinder 73. This expands or drives outwardly each of the two pistons 72, so as to cut the pair of auxiliary rubber springs 60 into service.

Referring particularly to the auxiliary rubber spring 60 at the left hand side of the vehicle, the movement of the corresponding piston 72, through the piston rod 71, swings the lever 69 counterclockwise as viewed in Fig. 4. This lever is fast to the outer metal sleeve or shell 66 of this auxiliary rubber spring and hence this movement of the lever 69 rotates this rubber spring until the face 85 of the segmental extension 80 of the inner steel tube 64 of this spring engages the face 86 of the radial segment 82 formed on the collar 81 which in turn is fast to the extension 61 of the crank arm 44.

The pressure imposed by the liquid so introduced into the hydraulic cylinder 73 can be of a fixed value to establish the degree of resilient resistance added by the pair of rubber springs 60 or can be adjusted to provide the desired amount of additional resilient resistance required for any particular load. This pressure establishes the degree of wind-up of the two rubber springs 60 and since the faces 85 and 86 of the lost motion device for each rubber spring are in engagement with each other, it will be seen that upward movement of each pair of crank arms 39 is resisted by the auxiliary springs 60 in addition to the rubber springs 46, the connection between each pair of crank arms 39 and the auxiliary rubber spring 60 comprising the crank arm 45, its extension tube 61, sleeve 81 and its radially projecting quadrant 82, face 86, face 85 of the quadrant or segmental extension 80 of the inner sleeve 64 of the corresponding rubber spring 60, and the rubber body 65 of this spring and which is vulcanized in the metal sleeve 64.

It will be noted that in both forms of the shackle structure 35, 35a shown, large oil reservoirs are supplied for maintaining the sintered metal bearing cups properly lubricated. At the same time, the shackle structures can be readily taken apart by the simple expedient of removing the end nuts from their central tie rods, this permitting direct withdrawal of the shackles. Further, all parts of the shackle assemblies are held in properly adjusted position by the inner nuts of the central tie rods of the shackle structures. It will therefore be seen that the forms of shackle structure shown also provide a very sturdy and easily applied structure which adequately transmits all drive and brake reaction forces as well as transmitting the vertical movements of the axle to the rubber springs.

From the foregoing it will be seen that the present invention provides a very simple and sturdy spring suspension in which auxiliary resilient resistance can be cut into service when the load on the vehicle demands such additional resilient resistance and without alteration of the frequency of the suspension. It will also be seen that the invention provides a shackle structure which is free from servicing difficulties, particularly in maintaining the shackles properly lubricated.

I claim:

1. In combination with a spring suspension adapted to be interposed between the frame structure and axle structure of a vehicle and having a pair of rubber torsion sleeves adapted to be secured to one of said structures, a crank shaft having a central crank arm and having its opposite ends fastened within said rubber torsion sleeves and a shackle adapted to connect the free end of said crank arm with the other of said structures, the combination therewith of means for selectively adding to the resistance to the rotation of said crank shaft, comprising an axial extension at one end of said crank shaft and projecting outwardly from the corresponding one of said rubber sleeves, a spring adapted to be mounted on said one of said structures, a lost motion mechanism between said extension and said spring and arranged to operatively connect said spring with said extension and means arranged to selectively take up the lost motion of said lost motion mechanism.

2. In combination with a spring suspension adapted to be interposed between the frame structure and axle structure of a vehicle and having a pair of rubber torsion sleeves adapted to be secured to one of said structures, a crank shaft having a central crank arm and having its opposite ends fastened within said rubber torsion sleeves and a shackle adapted to connect the free end of said crank arm with the other of said structures, the combination therewith of means for selectively adding to the resistance to the rotation of said crank shaft, comprising an axial extension at one end of said crank shaft and projecting outwardly from the corresponding one of said rubber sleeves, a torsion spring arranged generally concentric with the axis of said extension, means adapted to secure said torsion spring to said one of said structures for rotation about said axis, a rotary lost motion mechanism arranged concentric with said axis and arranged between said extension and said torsion spring to operatively connect said torsion spring with said extension, and means arranged to rotate said torsion spring to take up the lost motion of said lost motion mechanism and to impress the resilient resistance of said torsion spring on said crank shaft.

3. In combination with a spring suspension adapted to be interposed between the frame structure and axle structure of a vehicle and having a pair of rubber torsion sleeves adapted to be secured to one of said structures, a crank shaft having a central crank arm and having its opposite ends fastened within said rubber torsion sleeves and a shackle adapted to connect the free end of said crank arm with the other of said structures, the combination therewith of means for selectively adding to the resistance to the rotation of said crank shaft, comprising an axial extension at one end of said crank shaft and projecting outwardly from the corresponding one of said rubber sleeves, a rubber torsion spring comprising an inner metal sleeve journaled on said extension, a rubber torsion sleeve surrounding and fast to said inner metal sleeve, and an outer metal sleeve embracing and fast to said last rubber torsion sleeve, means adapted to secure said outer sleeve to said one of said structures for rotation about its axis, a rotary lost motion mechanism arranged concentric with said axis and arranged between said extension and said inner metal sleeve to operatively connect said inner metal sleeve and said extension, and means arranged to rotate said outer metal sleeve to take up the lost motion of said lost motion mechanism and to impress the resilient resistance of said last rubber torsion sleeve on said crank shaft.

4. In combination with a spring suspension adapted to be interposed between the frame structure and axle structure of a vehicle and having a pair of rubber torsion sleeves adapted to be secured to one of said structures, a crank shaft having a central crank arm and having its opposite ends fastened within said rubber torsion sleeves and a shackle adapted to connect the free end of said crank arm with the other of said structures, the combination therewith of means for selectively adding to the resistance to the rotation of said crank shaft, comprising an axial extension at one end of said crank shaft and projecting outwardly from the corresponding one of said rubber sleeves, a rubber torsion spring comprising an inner metal sleeve journaled on said extension, a rubber torsion sleeve surrounding and fast to said inner metal sleeve, and an outer metal sleeve embracing and fast to said last rubber torsion sleeve, means adapted to secure said outer sleeve to said one of said strucures for rotation about its axis, a segmental projection at the end of said extension, a segmental projection on the corresponding end of said inner sleeve and arranged in the path of said first segmental extension with a substantial spacing therebetween, and means arranged to rotate said outer metal sleeve to effect engagement between said segmental extensions and to impress the resilient resistance of said last rubber torsion sleeve on said crank shaft.

5. In combination with a spring suspension adapted to be interposed between the frame structure and axle structure of a vehicle and having a crank shaft adapted to be pivoted on one of said structures and resiliently restrained against rotation relative thereto and a shackle adapted to connect the free end of the crank arm of said crank shaft with the other of said structures, the combination therewith of means for selectively adding to the resistance to the rotation of said crank shaft, comprising an axial extension at one end of said crank shaft, a rubber torsion spring comprising an inner metal sleeve journaled on said extension, a rubber torsion sleeve surrounding and fast to said inner metal sleeve and an outer metal sleeve embracing and fast to said rubber torsion sleeve, a rotary lost motion mechanism arranged concentric with said axis and arranged between said extension and said inner metal sleeve to operatively connect said inner metal sleeve and said extension and means arranged to rotate said outer metal sleeve to take up the lost motion of said lost motion mechanism and to impress the resilient resistance of said rubber torsion sleeve on said crank shaft.

6. In combination with a spring suspension adapted to be interposed between the frame structure and axle structure of a vehicle and having a crank shaft adapted to be pivoted on one of said structures and resiliently restrained against rotation relative thereto and a shackle adapted to connect the free end of the crank arm of said crank shaft with the other of said structures, the combination therewith of means for selectively adding to the resistance to the rotation of said crank shaft, comprising an axial extension at one end of said crank shaft, a rubber torsion spring comprising an inner metal sleeve journaled on said extension, a rubber torsion sleeve surrounding and fast to said inner metal sleeve and an outer metal sleeve embracing and fast to said rubber torsion sleeve, a segmental projection at the end of said extension, a segmental projection on the corresponding end of said inner sleeve and arranged in the path of said first segmental extension with a substantial spacing therebetween, and means adapted to rotate said outer sleeve to effect engagement between said segmental extensions and to impress the resilient resistance of said rubber torsion sleeve on said crank shaft.

ALBERT F. HICKMAN.

REFERENCES CITED

The following references are of record in the file of this patent:

UNITED STATES PATENTS

| Number | Name | Date |
|---|---|---|
| 1,980,166 | Calkins | Nov. 13, 1934 |
| 2,007,387 | Stevenson | July 9, 1935 |
| 2,065,822 | Mullin | Dec. 29, 1936 |
| 2,242,030 | Hicks | May 13, 1941 |
| 2,245,585 | Hickman | June 17, 1941 |
| 2,254,261 | Best | Sept. 2, 1941 |
| 2,290,183 | Hickman | July 21, 1942 |
| 2,409,501 | Krotz | Oct. 15, 1946 |
| 2,450,506 | Flogaus | Oct. 5, 1948 |
| 2,477,187 | Lanchner | July 26, 1949 |

FOREIGN PATENTS

| Number | Country | Date |
|---|---|---|
| 844,796 | France | May 1, 1939 |